(12) United States Patent
Kristensen et al.

(10) Patent No.: US 11,985,983 B2
(45) Date of Patent: May 21, 2024

(54) AUTOMATIC FISH CLEANING DEVICE

(71) Applicant: KROMA A/S, Skive (DK)

(72) Inventors: Ivan Kristensen, Viborg (DK); Daniel Braad Jørgensen, Silkeborg (DK)

(73) Assignee: KROMA A/S, Skive (DK)

( * ) Notice: Subject to any disclaimer, the term of this patent is extended or adjusted under 35 U.S.C. 154(b) by 327 days.

(21) Appl. No.: 17/606,874

(22) PCT Filed: Apr. 23, 2020

(86) PCT No.: PCT/DK2020/050111
§ 371 (c)(1),
(2) Date: Oct. 27, 2021

(87) PCT Pub. No.: WO2020/221404
PCT Pub. Date: Nov. 5, 2020

(65) Prior Publication Data
US 2022/0211055 A1 Jul. 7, 2022

(30) Foreign Application Priority Data
May 1, 2019 (DK) .......................... PA 2019 70274

(51) Int. Cl.
*A22C 25/00* (2006.01)
*A22C 25/14* (2006.01)
(52) U.S. Cl.
CPC ................................ *A22C 25/147* (2013.01)
(58) Field of Classification Search
CPC .................................................. A22C 25/147
(Continued)

(56) References Cited

U.S. PATENT DOCUMENTS 5,026,318 A * 6/1991 Jahnke .................... A22C 25/14
452/116
5,980,376 A * 11/1999 Grosseholz ............ A22C 25/14
452/116

(Continued)

FOREIGN PATENT DOCUMENTS

DE        2832259 B1   10/1979
WO   WO 2016/138945 A1   9/2016
WO   WO 2017/186241 A1   11/2017

OTHER PUBLICATIONS

International Patent Application No. PCT/DK2020/050111; Int'l Search Report and the Written Opinion; dated Jul. 23, 2020; 15 pages.

*Primary Examiner* — Richard T Price, Jr.
(74) *Attorney, Agent, or Firm* — BakerHostetler

(57) ABSTRACT

The invention provides a fish processing device for cleaning blood and blood vessels from the spine of a fish, e.g. a salmon, after the visceral has been removed. A jet nozzle for spraying pressurized liquid and a movable suction device with a vacuum nozzle for entering the abdominal cavity of the fish serve in combination to clean the spine of the fish for blood and blood vessels. A controller controls an actuator for moving the vacuum nozzle to enter the abdominal cavity of the fish, and it is then moved in a first direction relative to the transport direction, until the first vacuum nozzle reaches an end of the abdominal cavity of said fish while sucking blood and blood vessels from the abdominal cavity along the spine of said fish. This is repeated by moving the vacuum nozzle in the opposite direction until reaching an opposite end of the abdominal cavity of said fish, where the vacuum nozzle exits the abdominal cavity. Preferably, the fish is continuously transported along with this cleaning process. Some embodiments comprise a second set of jet nozzle and suction device mounted downstream of the fish transport (Continued)

direction to allow even further cleaning of blood and blood vessels along the spine of the fish.

15 Claims, 11 Drawing Sheets

(58) Field of Classification Search
USPC .......................................................... 452/121
See application file for complete search history.

(56) References Cited

U.S. PATENT DOCUMENTS

| | | | |
|---|---|---|---|
| 7,179,163 B1 | 2/2007 | Vedsted et al. | |
| 7,427,229 B2 * | 9/2008 | Grosseholz | A22C 25/14 |
| | | | 452/121 |
| 7,559,830 B2 * | 7/2009 | Solberg | A22C 25/145 |
| | | | 452/121 |
| 7,828,635 B2 * | 11/2010 | Paulsohn | A22C 25/147 |
| | | | 452/116 |
| 9,078,454 B2 * | 7/2015 | Jurs | A22C 25/16 |
| 2009/0233534 A1 | 9/2009 | Paulsohn et al. | |

* cited by examiner

AUTOMATIC FISH CLEANING DEVICE

CROSS-REFERENCE TO RELATED APPLICATIONS

This application is the National Stage of International Patent Application No. PCT/DK2020/050111, filed Apr. 23, 2020, which claims the benefit of Danish application number PA 2019 70274, filed May 1, 2019, the entireties of which foregoing applications are incorporated herein by reference in their entireties for any and all purposes.

FIELD OF THE INVENTION

The present invention relates to an automatic fish cleaning device and method for removing blood and blood vessels from the abdominal cavity, along the spine of the fish.

BACKGROUND OF THE INVENTION

When cleaning fish, such as salmon, in an automated fish processing system, it is a regular occurrence that blood and blood vessels along the spine of the fish are not removed to a satisfactory level, relative to a desired level of removal when performing a manual processing of the fish.

It is known that cleaning the abdominal cavity of a fish requires delicate handling due to the fragile nature of fish meat. Automated fish processing systems are known to lack the required delicate handling, while at the same time working at a high fish cleaning rate. In order to not damage the valuable fish meat, the trade-off for delicate handling and fast pace is lower cleaning quality, compensated by additional manual cleaning. The extra step of manually processing fish, which are not sufficiently clean relative to a quality level, is both expensive and time consuming.

Hence, an improved fish processing device would be advantageous, and in particular a more efficient and/or reliable fish cleaning device and method for removing blood along the spine of the abdominal cavity of a fish would be advantageous.

SUMMARY OF THE INVENTION

Thus, according to the above description, it may be seen as an object of the present invention to provide an automatic fish processing device for cleaning the abdominal cavity of fish, specifically a device for cleaning the blood and blood vessels along the spine of the fish to a predetermined quality requirement.

Preferably, the fish processing device can clean blood and blood vessels to a sufficient level to eliminate manual handling, still without damaging the fish meat.

In a first aspect the invention provides a fish processing device arranged to receive a fish, said fish processing device comprising:
  a transport mechanism with a surface arranged to transport the fish along a transport direction, said fish being oriented with a head end towards or opposite the transport direction and the abdominal cavity oriented opposite to the surface of the transport mechanism,
  a first suction device comprising:
    a first vacuum nozzle arranged to suck at least liquid and blood vessels from the fish,
    a first actuator mechanism for moving the first vacuum nozzle,
    at least a first jet nozzle arranged to spray a pressurized liquid into the abdominal cavity of the fish, so as to loosen blood and blood vessels along the spine of said fish,
  a controller arranged to control the first actuator mechanism and the at least first jet nozzle, so as:
    to cause the first jet nozzle to spray pressurized liquid along the spine of said fish,
    to cause the first vacuum nozzle to enter the abdominal cavity of the fish in a first angle relative to a longitudinal axis of said fish, to move the first vacuum nozzle in a first direction relative to the transport direction, until the first vacuum nozzle reaches an end of the abdominal cavity of said fish while sucking blood and blood vessels from the abdominal cavity along the spine of said fish, and
    to cause the first vacuum nozzle to be oriented towards the abdominal cavity of the fish at a second angle relative to the longitudinal axis of said fish, and to move the first vacuum nozzle in a second direction being opposite the first direction while sucking blood and blood vessels from the abdominal cavity along the spine of said fish, until reaching an opposite end of the abdominal cavity of said fish, where the first vacuum nozzle is moved to exit the abdominal cavity of said fish.

The invention is particularly, but not exclusively, advantageous for obtaining sufficient removal of blood and blood vessels along the spine of a fish, within the abdominal cavity, after the fish has been cut open and the visceral has been removed from the abdominal cavity. Thus, the fish processing device is advantageous for being a post-processing part of an automated or semi-automated fish processing device including means for performing the processing steps of cutting the fish open, and removing the visceral from the abdominal cavity of the fish.

The shape of the first vacuum nozzle is preferably designed to keep the abdominal cavity of the fish open and the movement of the first vacuum nozzle along the spine, while the nozzle is tilted, enables the first vacuum nozzle to at the same time, scoop or sweep along the spine while the vacuum ensures that all loose objects are sucked into the nozzle. Furthermore, the jet nozzle is preferably aimed at the spine, thus ensuring that small pockets of blood are sprayed out of said pockets so as to be scooped/swept and sucked away from the fish.

The actuator mechanism ensures that the vacuum nozzle, when reaching either a head or tail end of the fish, alternates the angle of the vacuum nozzle before the vacuum nozzle then moves through the abdominal cavity a second time, further cleaning along the spine of the fish.

The combination of the tilted angle of the vacuum nozzle, the sweeping/scooping movement of the vacuum nozzle and the cleaning properties of the pressurized liquid from the jet nozzle ensures that the automated cleaning process performed to a high degree of consistency and to a satisfactory cleaning quality, compared to a manual fish cleaning process.

Thus, the invention offers the high pace and capacity of an automated system built for mass-processing, while cleaning to a high level of quality, comparable to a careful and thorough manual cleaning process of a fish.

In the context of the present invention, transport mechanism is to be understood as an automated mechanism suitable for transporting a fish along a predetermined path or production/processing line, such as a conveyor belt.

In the context of the present invention, vacuum nozzle is to be understood as a device for controlling the fluid flow from an entry point of the nozzle towards a mechanism generating a negative pressure or vacuum. In the present invention, the vacuum nozzle is shaped so as to ensure that the fish meat is not damaged or torn, hence the vacuum nozzle has a rounded shape with a hollow tubular shape in the centre of the nozzle for providing the negative pressure to the mouth end of the nozzle.

In the context of the present invention, spine is to be understood as the visceral edge of the abdominal cavity along the spinal column of the fish.

In the context of the present invention, jet nozzle is to be understood as a device facilitating the dispersion of liquid or pressurized liquid into a spray. In the present invention, the jet nozzle creates distributes a liquid with an impact force suitable for cleaning blood and blood vessels from abdominal cavity of a fish without damaging the fish meat, hence at a precise pressure which displaces a specific impact force.

It is to be understood, that such a fish processing device may comprise further elements, such as a cutting mechanism for opening the abdominal cavity of the fish and cleaning devices for removing the intestines etc. and further steps for either processing the fish or automated quality control.

In preferred embodiments the transport mechanism is arranged to continuously move the fish in the transport direction while the first vacuum nozzle is inside the abdominal cavity of the fish. The continued movement of the fish while undergoing the cleaning process increases the overall capacity of the fish processing device, as the movement of the fish is not slowed down or stopped during the cleaning process. The increased capacity due to the continuous movement decrease the unit cost of a cleaned fish, as one fish processing device according to the invention can clean more fish than a device which stops or slows down the fish during the cleaning process.

In an embodiment of the invention, the first direction is the transport direction wherein the vacuum nozzle moves faster than the fish on the transport mechanism so as to reach the head end of the fish which ensures that the fish is continuously being transported while, at the same time, being cleaned, reducing the time spent on processing the fish.

In another preferred embodiment of the invention, the first vacuum nozzle is arranged to pivot around an axis so as to change between the first and second angle of orientation relative to the longitudinal axis of the fish. The vacuum nozzle moves in a first direction, either towards the head or tail end of the fish, at an angle which enables the vacuum nozzle to sweep or scoop along the abdominal cavity of the fish, and when reaching an end, altering the angle of the vacuum nozzle relative to the longitudinal axis of the fish and moving to the opposite end of the fish so as to clean at least a length of the fish two times. When the vacuum nozzle cleans the fish from the head end towards the tail end, the vacuum nozzle can either keep still in which the movement of the fish along the transport mechanism cause the relative movement between the vacuum nozzle and the fish or the vacuum nozzle can move in the opposite direction of the movement of the transport mechanism, which increases the relative speed of movement between the vacuum nozzle and the fish respectively, further decreasing the cleaning time spend on cleaning the fish.

In an advantageous embodiment of the invention, the first jet nozzle is mounted fixed to the first vacuum nozzle, so as to enter the abdominal cavity of the fish together with the first vacuum nozzle which eliminate the need of a separate mechanism for moving the jet nozzle relative to the fish, lower the manufacturing and maintenance costs of the fish processing device.

In a preferred embodiment of the invention, the first vacuum nozzle is controlled to enter the abdominal cavity of the fish substantially in the middle, relative to a longitudinal length of the fish, as the middle of the fish may be the where the abdomen is widest, ensuring easy entry of the vacuum nozzle into the abdominal cavity of the fish, increasing consistency of the automated cleaning process.

In another embodiment of the invention, the fish processing device further comprises a second suction device located after the first suction device, relative to the transport direction of the transport mechanism, the second suction device comprising a second vacuum nozzle, a second actuator mechanism controlled to cause the vacuum nozzle to enter and exit the abdominal cavity of the fish, so as to suck remaining blood and blood vessels along the spine of the fish and further increase the cleaning quality of the automated cleaning process and ensure complete removal of any residual liquid from the abdominal cavity of the fish to ease an optional automated visual quality control of the cleaned fish.

In an advantageous embodiment of the invention, the fish processing device further comprise a second jet nozzle arranged to spray pressurized liquid into the abdominal cavity of the fish, at least partly, along the spine of said fish at least partly while the second vacuum nozzle sucks remaining blood and blood vessels from the abdominal cavity of said fish and further increase the cleaning quality of the automated cleaning process.

It may be preferred that the fish is transported with its head towards the transport direction.

In a preferred embodiment of the invention, the second vacuum nozzle enters the abdominal cavity of the fish less than 1 second after the first vacuum nozzle exits the abdominal cavity of said fish.

The inventors have found that one suction device and one jet nozzle is sufficient to ensure cleaning of the fish to eliminate manual post processing, however a second suction device and jet nozzle arrangement can be added to provide an even higher degree of cleaning in an automated processing. Especially the first and second sets of suction devices and jet nozzles may be identical, however it may be preferred that they differ with respect to e.g. liquid pressure, shape of the vacuum nozzle or other parameters.

In an advantageous embodiment of the invention, the pressurized liquid is sprayed from the first jet nozzle with a pressure of between 1 and 50 bar, preferably between 2 and 25 bar, e.g. such as between 5 and 15 bar which ensures that the valuable fish meat is not destroyed while at the same time ensuring proper cleaning of blood and blood vessels along the spine of the fish, such as in pockets along the spine within the abdominal cavity of the fish. It is to be understood that the liquid pressure is to be kept at a level to ensure that fish meat is not destroyed, and in general therefore the pressure should be selected to match the type of fish to be cleaned.

In a more advantageous embodiment of the invention, the first vacuum nozzle is arranged to suck with a pressure being between −0.1 and −0.8 bar, preferably between −0.2 and 0.6 bar, and most preferably between −0.3 and −0.5 bar which ensures that the valuable fish meat is not destroyed while at the same time ensuring proper cleaning of blood and blood vessels in the abdominal cavity of the fish.

In a preferred embodiment of the invention, the first vacuum nozzle enters the abdominal cavity of the fish at the first angle being between 1 and 89 degrees, more preferably between 10 and 70 degrees, and most preferably between 20 and 60 degrees so as to enable the vacuum nozzle an optimal angle of attack for both scooping/sweeping along the spine of the fish while sucking away any liquid, blood, blood vessels or other undesired objects within the abdominal cavity of the fish. The angle may as well be 90-110 degrees.

In another preferred embodiment of the invention, the controller is arranged to cause the first vacuum nozzle to be oriented at the second angle being between 179 and 91 degrees, preferably between 170 and 110 degrees, and most preferably between 160 and 120 degrees so as to ensure that the vacuum nozzle, if/when moving in an opposite direction relative to a movement performed while in a first angle, has an optimal angle of attack for both scooping/sweeping along the spine of the fish while sucking away any liquid, blood, blood vessels or other undesired objects within the abdominal cavity of the fish.

In an advantageous embodiment of the invention, the first vacuum nozzles is shaped like a half moon and wherein the radius of said half moon shape is between 2 and 8 cm, more preferably between 3 and 7 cm and most preferably between 4 and 6 cm so as to ensure that the vacuum nozzle keeps the abdominal cavity sufficiently open for thorough cleaning, separating the viscera of the abdomen and provide sufficient access to the bottom part of the abdominal cavity wherein the spine of the fish is situated and in which blood and blood vessels are hard to reach, while the radius of the vacuum nozzle at the same time ensures that the fish meat is handled delicately so as to prevent destroying or tearing the fish meat.

The vacuum nozzle forms a lip which should be shaped and sized to avoid damaging the fish meat. Thus, the shape and width of this lip is preferably designed to match the type of fish to be cleaned to provide a preferred compromise between cleaning efficiency and minimal risk of damaging the fish meat.

In another advantageous embodiment of the invention, the fish processing device further comprises a sensor, such as a camera, arranged to inspect the abdominal cavity at least partly along the spine of said fish to ensure that the cleaning of the abdominal cavity is performed to a sufficient quality. The sensor may be placed either after a first or second vacuum nozzle and when placed after a first vacuum nozzle might instruct a controller to either, when the cleaning is approved, disable a second vacuum nozzle from cleaning the fish or, when the cleaning is not approved, activate the second vacuum nozzle to perform an second cleaning of the abdominal cavity of the fish.

In an embodiment of the invention, the first suction device further comprises a blade for cutting along the spine, in the abdominal cavity of the fish so as to ensure that the abdominal cavity along the spine is sufficiently open, in case that a prior cutting process has not been sufficient, for a thorough automated cleaning.

In a preferred embodiment of the invention, the fish processing device further comprise a visceral removal mechanism being arranged to open the abdominal cavity of the fish and to remove the visceral from the abdominal cavity, prior to the fish being transported to the first suction device.

It may be preferred to have at least two spraying nozzles, one on the first suction device and one on a second suction device, thus ensuring liquid spraying at least twice during the cleaning operation.

The liquid spraying may be performed in general at any time during the cleaning operation, i.e. from one or more short intervals up to one large interval which may cover the entire cleaning operation.

In a second aspect, the invention provides a method for removing blood and blood vessels along a spine of a fish, the method comprises
  transporting the fish along a transport direction,
  spraying pressurized liquid at least from a first jet nozzle into the abdominal cavity of the fish, so as to loosen blood and blood vessels along the spine of the fish,
  causing a first vacuum nozzle to enter the abdominal cavity of the fish in a first angle relative to a longitudinal axis of said fish, and moving the first vacuum nozzle in a first direction relative to the transport direction, until the first vacuum nozzle reaches the an end of the abdominal cavity of said fish while sucking blood and blood vessels from the abdominal cavity along the spine of said fish,
  causing the first vacuum nozzle to be oriented towards the abdominal cavity of the fish at a second angle relative to the longitudinal axis of said fish, and moving the first vacuum nozzle in a second direction being opposite the first direction while sucking blood and blood vessels from the abdominal cavity along the spine of said fish, and
  causing the first vacuum nozzle to exit the abdominal cavity of said fish, when the first vacuum nozzle reaches an opposite end of the abdominal cavity of said fish.

The method as described in the second aspect is suited for use in an automated fish processing device being controlled by a computer or other automated controller. The first and second aspect of the present invention and any embodiments may be combined with each other.

BRIEF DESCRIPTION OF THE FIGURES

The fish processing device according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
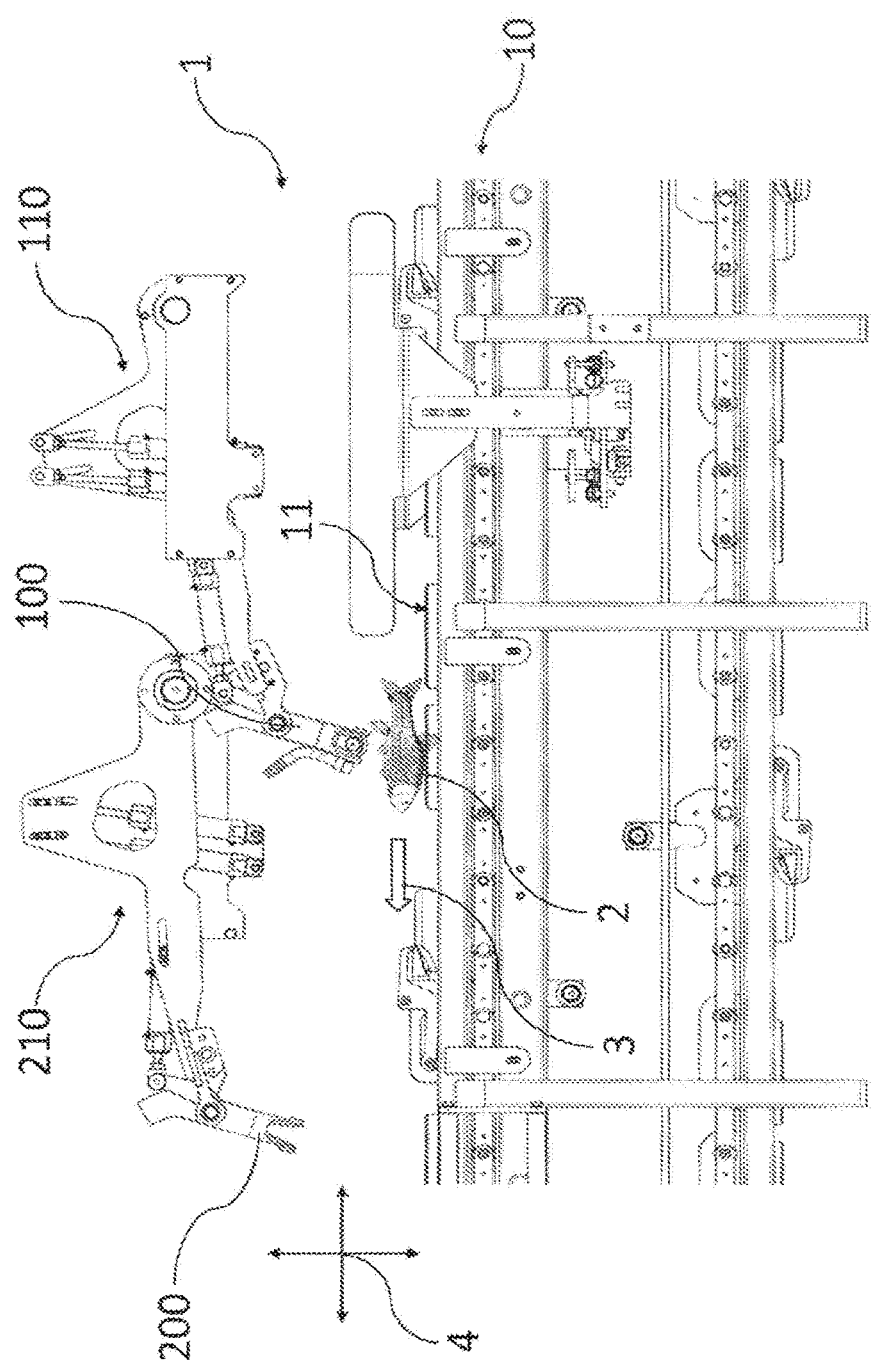
FIG. 1 is a side view of a fish processing device.

FIG. 1 is a side view of a fish processing device 1 with a first and second suction devices 100, 200 arranged above a transport mechanism 10. The two suction devices 100, 200 are arranged with a first and second actuator mechanisms 110, 210 enabling the suction devices 100, 200 to move in at least two axes 4. A fish 2 is moving along a transport direction 3 with its head towards the transport direction 3. The fish 2 is lying on its back side on a surface 11 of the transport mechanism 10, with its abdomen facing upwards, towards the first suction device 100.

Figure 2A:
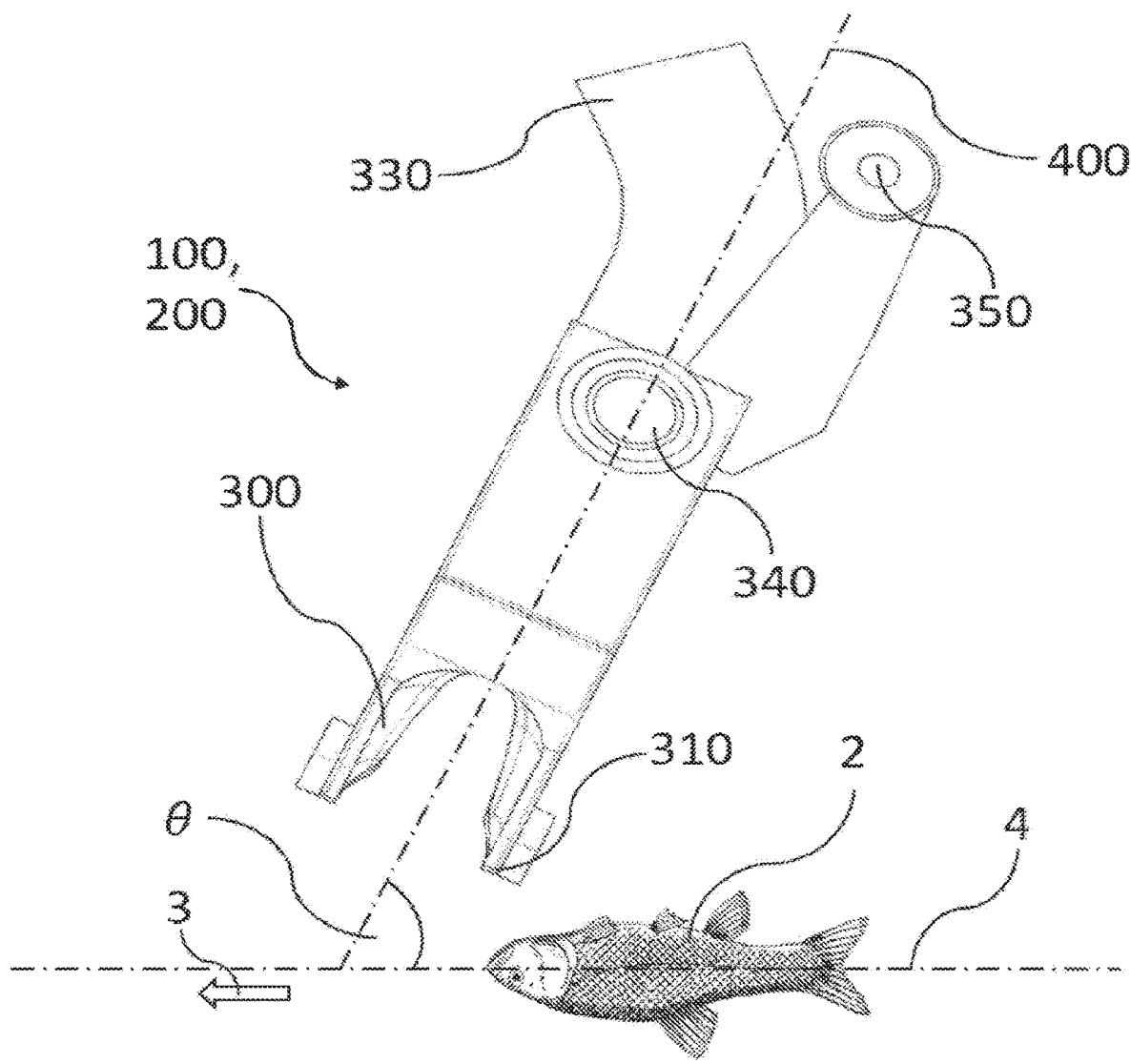
FIG. 2A is a side view of a suction device.

FIG. 2A is a side view of a first or second suction device 100, 200 arranged above a fish 2 with its head towards the transport direction 3. The suction device 100, 200 comprises a vacuum nozzle 300 towards the fish 2, the vacuum nozzle 300 shaped with a lip 310 suitable for scooping along the spine of the fish 2. At the opposite end of the vacuum nozzle 300, the suction device 100, 200 has a duct 330 attached to a vacuum mechanism (not shown) providing suction to the vacuum nozzle 300. The suction device 100, 200 is tilted at an angle θ, between the longitudinal axis of the fish 4 and the longitudinal axis of the suction device 400. The suction device 100, 200 is able to change the angle θ by pivoting around the rotation bracket 340 and move through actuation from the actuator mechanism (not shown) which is attached to the suction device 100, 200 through the actuator bracket 350.

Figure 2B:
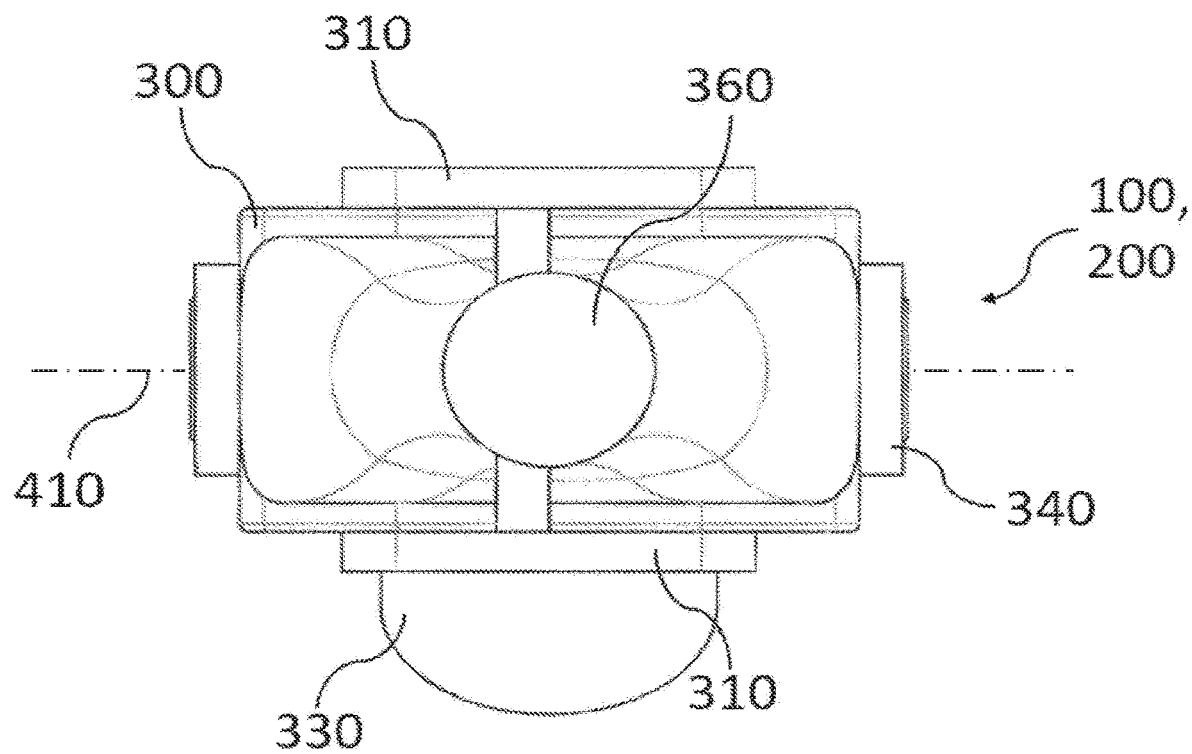
FIG. 2B is a bottom view of a suction device.

FIG. 2B is a bottom view of a first or second suction device 100, 200 with a lip 310 on the front and back of the vacuum nozzle 300. In the centre of the vacuum nozzle 300 there is a suction tube 360 for sucking blood, blood vessels etc. from the abdominal cavity of a fish (not shown). On the front side, the outline of the duct 330 is visible, which is attached to a vacuum mechanism (not shown) providing suction from the duct 330 to the suction tube 360. The suction device 100, 200 can pivot around an axis 410, by rotating through the rotation brackets 340 mounted to the suction device 100, 200 on two sides.

Figure 2C:
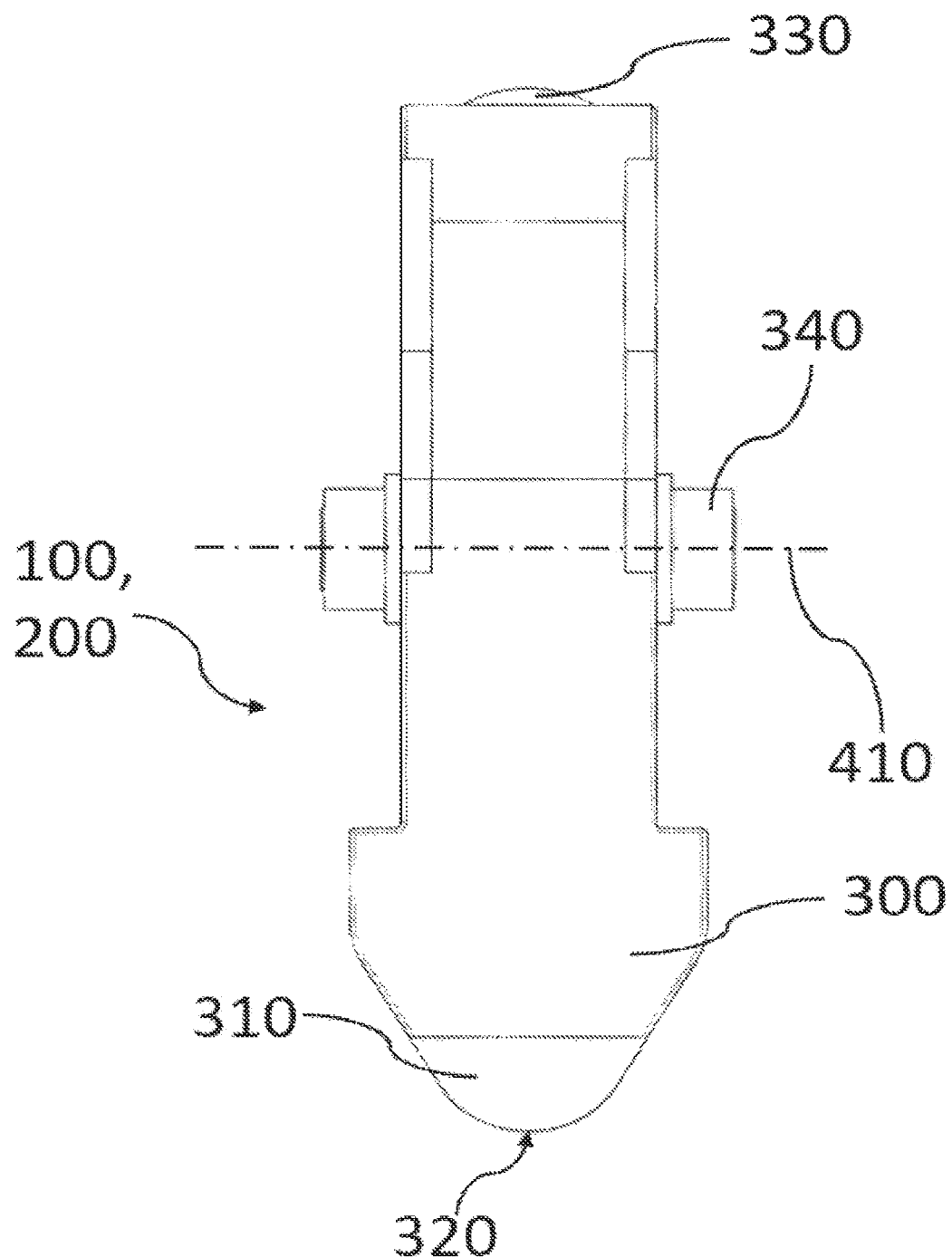
FIG. 2C is a frontal view of a suction device.

FIG. 2C is a frontal view of a first or second suction device 100, 200. At one end, the suction device 100, 200 comprises a duct 330 attached to a vacuum mechanism (not shown) providing suction to the vacuum nozzle 300 at the opposite end of the suction device 100, 200. The vacuum nozzle comprises a lip 310 with a rounded lip edge 320, suitable for scooping blood, blood vessels etc. from the abdominal cavity of a fish (not shown) without damaging the fish meat. The suction device 100, 200 can pivot around an axis 410, by rotating through the rotation brackets 340 mounted to the suction device 100, 200 on two sides.

Figure 3:
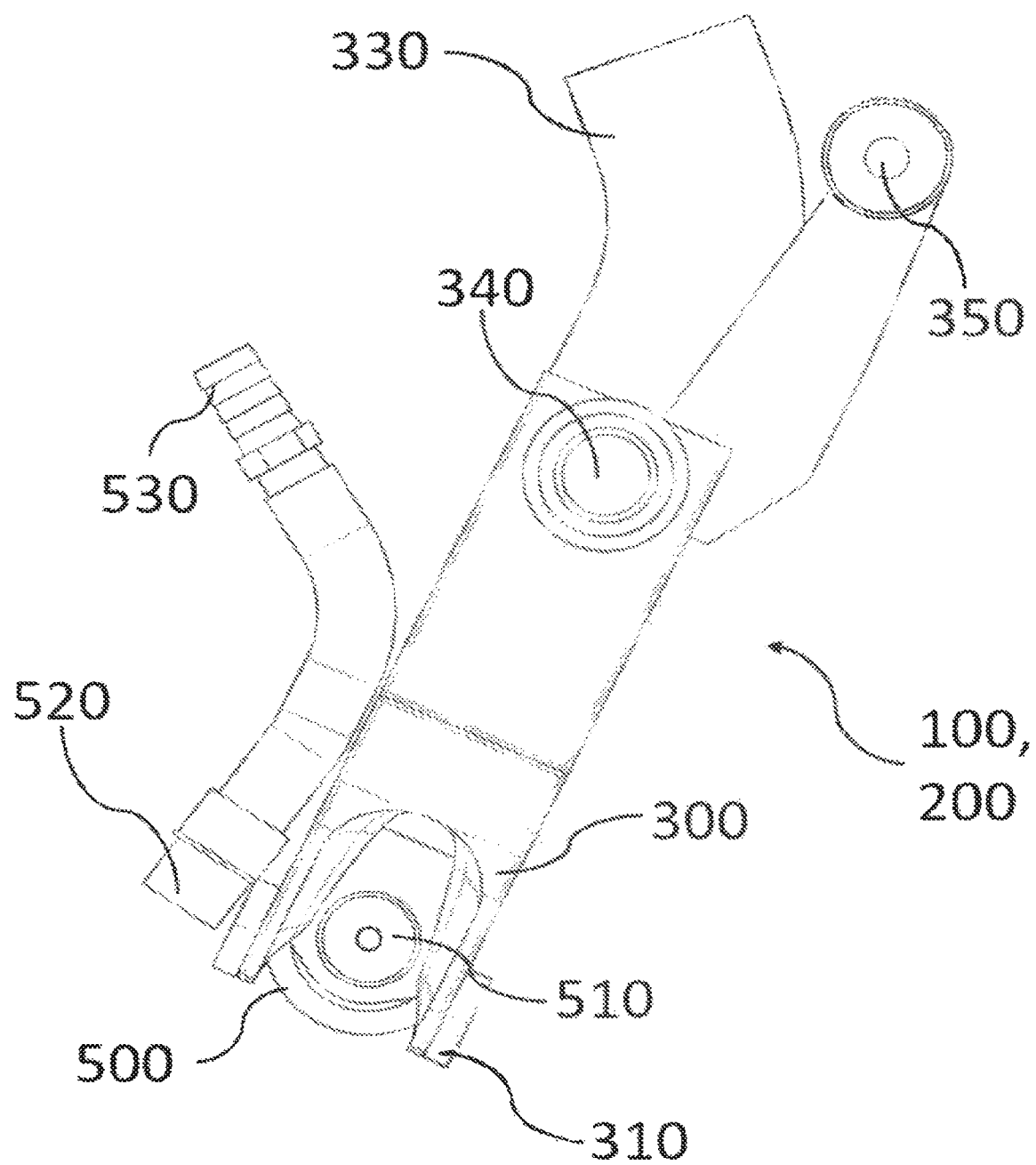
FIG. 3 is a side view of a suction device with a blade and front-mounted jet-nozzle.

FIG. 3 is a side view of a first or second suction device 100, 200 with a jet nozzle 520 mounted on the front, the jet nozzle 520 arranged with a connector 530 to connect the jet nozzle 520 to a pressurized liquid (not shown) so as to spray along the spine in the abdominal cavity of a fish (not shown). The suction device 100, 200 has a vacuum nozzle 300 at one end with a lip 310, suitable for scooping blood, blood vessels, liquid etc. from the abdominal cavity of a fish (not shown) without damaging the fish meat. Further, the vacuum nozzle 300 has a blade 500 rotatably mounted inside the vacuum nozzle 300, the blade 500 arranged with a motor 510 to enable the blade 500 to rotate. At the opposite end of the vacuum nozzle 300, the suction device 100, 200 has a duct 330 attached to a vacuum mechanism (not shown) providing suction to the vacuum nozzle 300. The suction device is able to pivot through the rotation bracket 340 and move through actuation from the actuator mechanism (not shown) which is attached to the suction device 100, 200 through the actuator bracket 350.

Figure 4A:
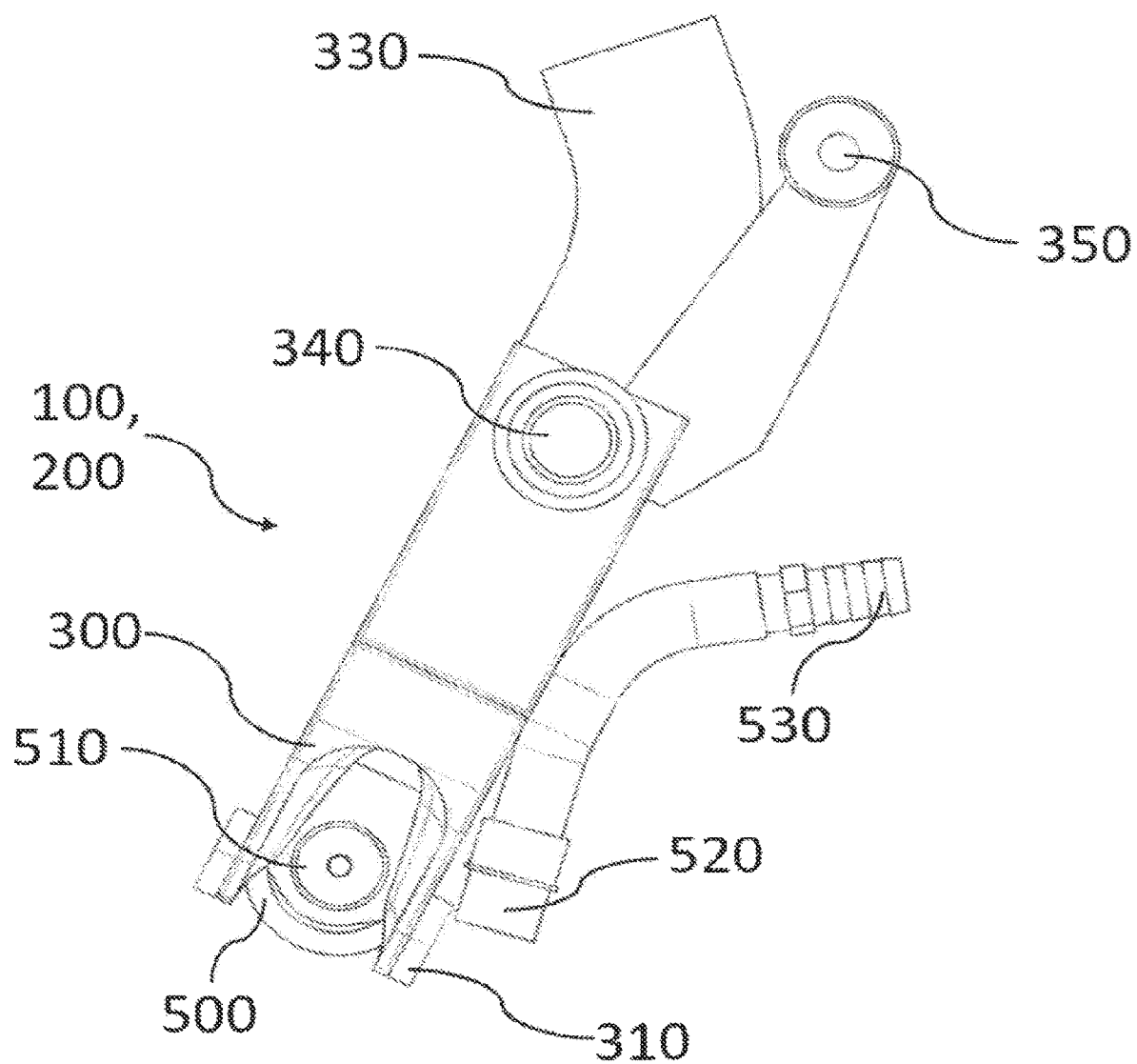
FIG. 4A is a side view of a suction device with a blade and back-mounted jet-nozzle.

FIG. 4A is a side view of a first or second suction device 100, 200 with a jet nozzle 520 mounted on the back, the jet nozzle 520 arranged with a connector 530 to connect the jet nozzle 520 to a pressurized liquid (not shown) so as to spray along the spine in the abdominal cavity of a fish (not shown). The suction device 100, 200 has a vacuum nozzle 300 at one end with a lip 310, suitable for scooping blood, blood vessels, liquid etc. from the abdominal cavity of a fish (not shown) without damaging the fish meat. Further, the vacuum nozzle 300 has a blade 500 rotatably mounted inside the vacuum nozzle 300, the blade 500 arranged with a motor 510 to enable the blade 500 to rotate. At the opposite end of the vacuum nozzle 300, the suction device 100, 200 has a duct 330 attached to a vacuum mechanism (not shown) providing suction to the vacuum nozzle 300. The suction device is able to pivot through the rotation bracket 340 and move through actuation from the actuator mechanism (not shown) which is attached to the suction device 100, 200 through the actuator bracket 350.

Figure 4B:
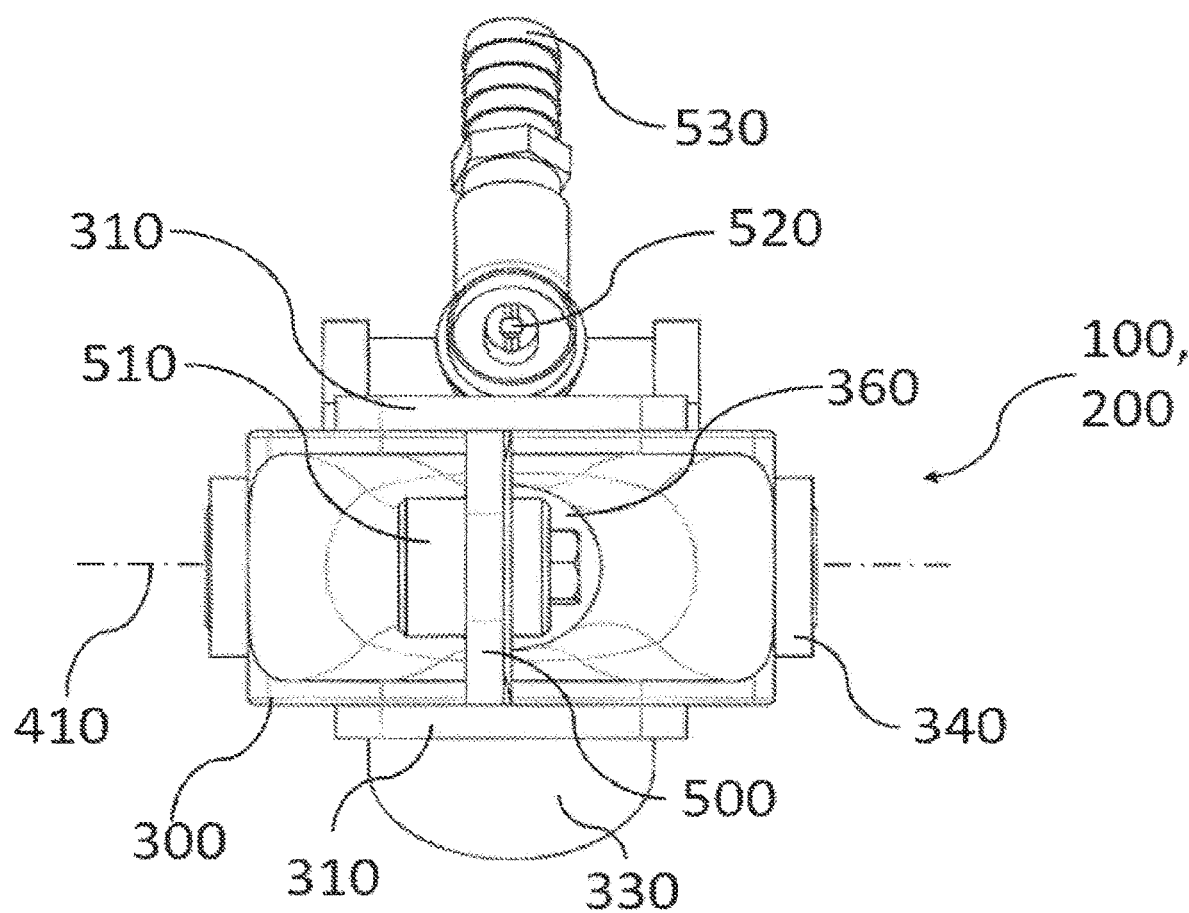
FIG. 4B is a bottom view of a suction device with a blade and back-mounted jet-nozzle.

FIG. 4B is a bottom view of a first or second suction device 100, 200 with a jet nozzle 520 mounted on the back, the jet nozzle 520 arranged with a connector 530 to connect the jet nozzle 520 to a pressurized liquid (not shown) so as to spray along the spine in the abdominal cavity of a fish (not shown). The suction device comprises a lip 310 on the front and back of the vacuum nozzle 300 suitable for scooping blood, blood vessels etc. In the centre of the vacuum nozzle 300 a blade 500 is rotatably mounted, attached to a motor 510. Behind the blade, 500, there is a suction tube 360 for sucking blood, blood vessels, liquid etc. from the abdominal cavity of a fish (not shown). On the front side, the outline of the duct 330 is visible, which is attached to a vacuum mechanism (not shown) providing suction from the duct 330 to the suction tube 360. The suction device 100, 200 can pivot around an axis 410, by rotating through the rotation brackets 340 mounted to the suction device 100, 200 on two sides.

Figure 5:
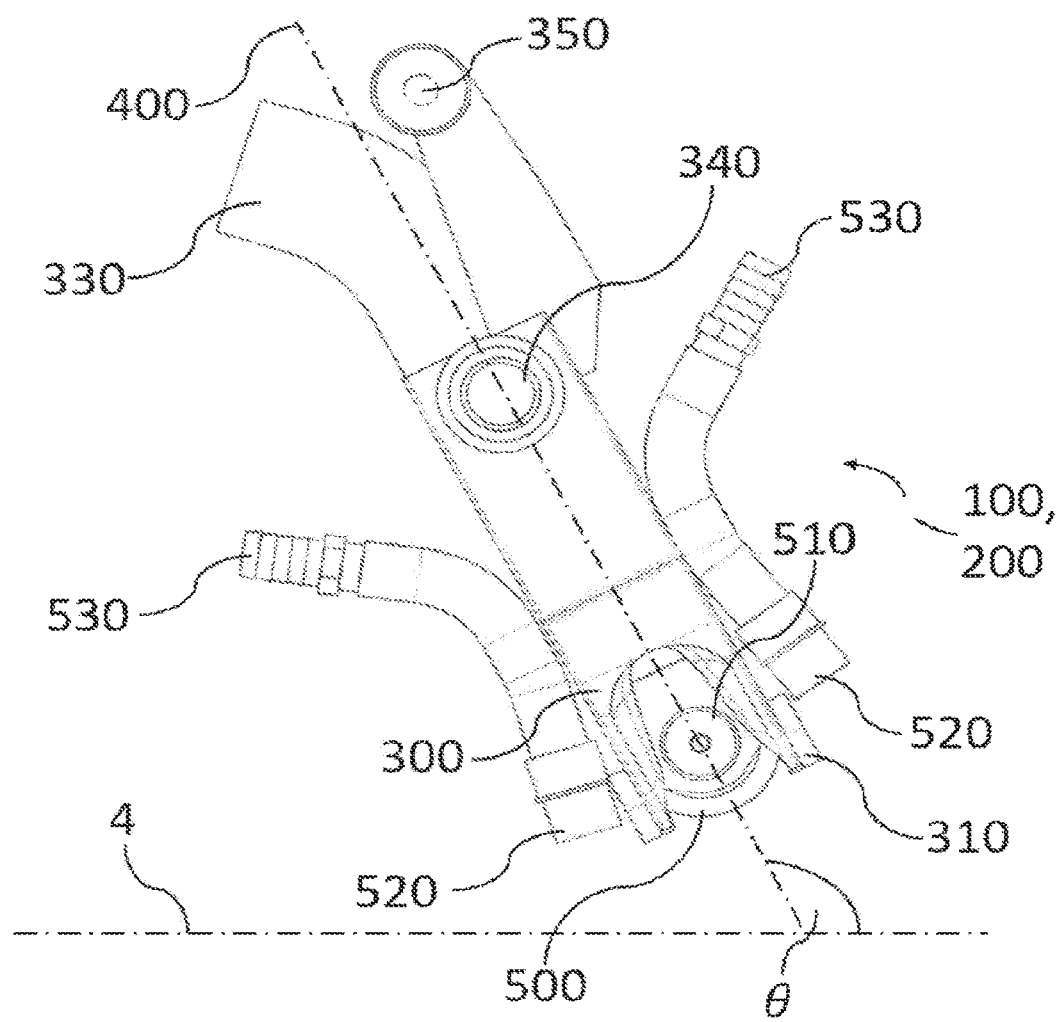
FIG. 5 is a side view of a suction device with a blade and back- and front-mounted jet-nozzle.

FIG. 5 is a side view of a first or second suction device 100, 200 with two jet nozzles 520 mounted on the front and back, the jet nozzles 520 arranged with a connector 530 to connect the jet nozzle 520 to a pressurized liquid (not shown) so as to spray along the spine in the abdominal cavity of a fish (not shown). The suction device 100, 200 has a vacuum nozzle 300 at one end with a lip 310, suitable for scooping blood, blood vessels, liquid etc. from the abdominal cavity of a fish (not shown) without damaging the fish meat. Further, the vacuum nozzle 300 has a blade 500 rotatably mounted inside the vacuum nozzle 300, the blade 500 arranged with a motor 510 to enable the blade 500 to rotate. At the opposite end of the vacuum nozzle 300, the suction device 100, 200 has a duct 330 attached to a vacuum mechanism (not shown) providing suction to the vacuum nozzle 300. The suction device 100, 200 is tilted at an angle θ, between the longitudinal axis of the fish 4 and the longitudinal axis of the suction device 400. The suction device 100, 200 is able to change the angle θ by pivoting around the rotation bracket 340 and move through actuation from the actuator mechanism (not shown) which is attached to the suction device 100, 200 through the actuator bracket 350.

Figure 6:
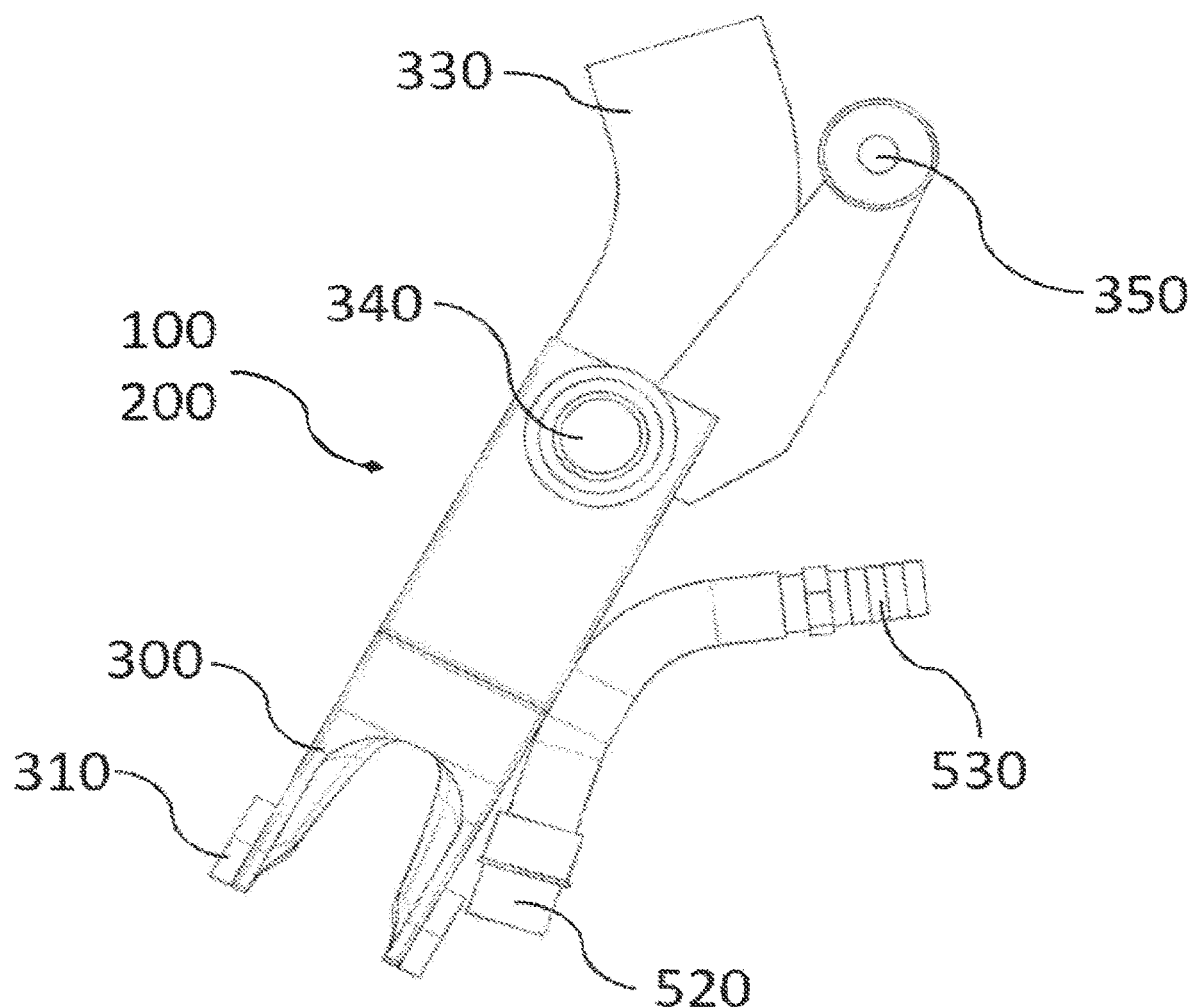
FIG. 6 is a side view of a suction device with a back-mounted jet-nozzle.

FIG. 6 is a side view of a first or second suction device 100, 200 with a jet nozzle 520 mounted on the back, the jet nozzle 520 arranged with a connector 530 to connect the jet nozzle 520 to a pressurized liquid (not shown) so as to spray along the spine in the abdominal cavity of a fish (not shown). The suction device 100, 200 has a vacuum nozzle 300 at one end with a lip 310, suitable for scooping blood, blood vessels, liquid etc. from the abdominal cavity of a fish (not shown) without damaging the fish meat. At the opposite end, the suction device 100, 200 has a duct 330 attached to a vacuum mechanism (not shown) providing suction to the vacuum nozzle 300. The suction device is able to pivot through the rotation bracket 340 and move through actuation from the actuator mechanism (not shown) which is attached to the suction device 100, 200 through the actuator bracket 350.

Figure 7:
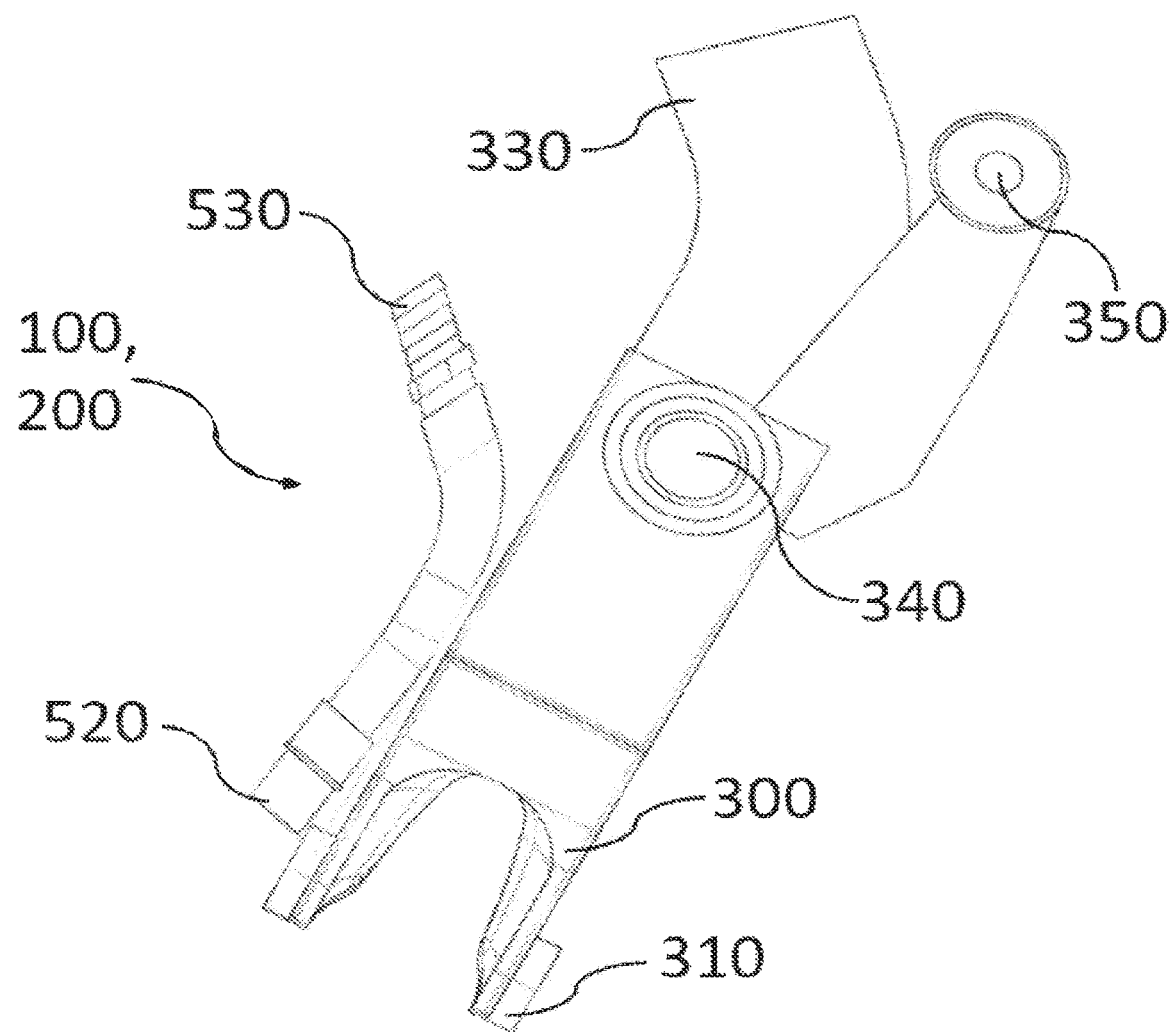
FIG. 7 is a side view of a suction device with a front-mounted jet-nozzle.

FIG. 7 is a side view of a first or second suction device 100, 200 with a jet nozzle 520 mounted on the front, the jet nozzle 520 arranged with a connector 530 to connect the jet nozzle 520 to a pressurized liquid (not shown) so as to spray along the spine in the abdominal cavity of a fish (not shown). The suction device 100, 200 has a vacuum nozzle 300 at one end with a lip 310, suitable for scooping blood, blood vessels, liquid etc. from the abdominal cavity of a fish (not shown) without damaging the fish meat. At the opposite end, the suction device 100, 200 has a duct 330 attached to a vacuum mechanism (not shown) providing suction to the vacuum nozzle 300. The suction device is able to pivot through the rotation bracket 340 and move through actuation from the actuator mechanism (not shown) which is attached to the suction device 100, 200 through the actuator bracket 350.

Figure 8:
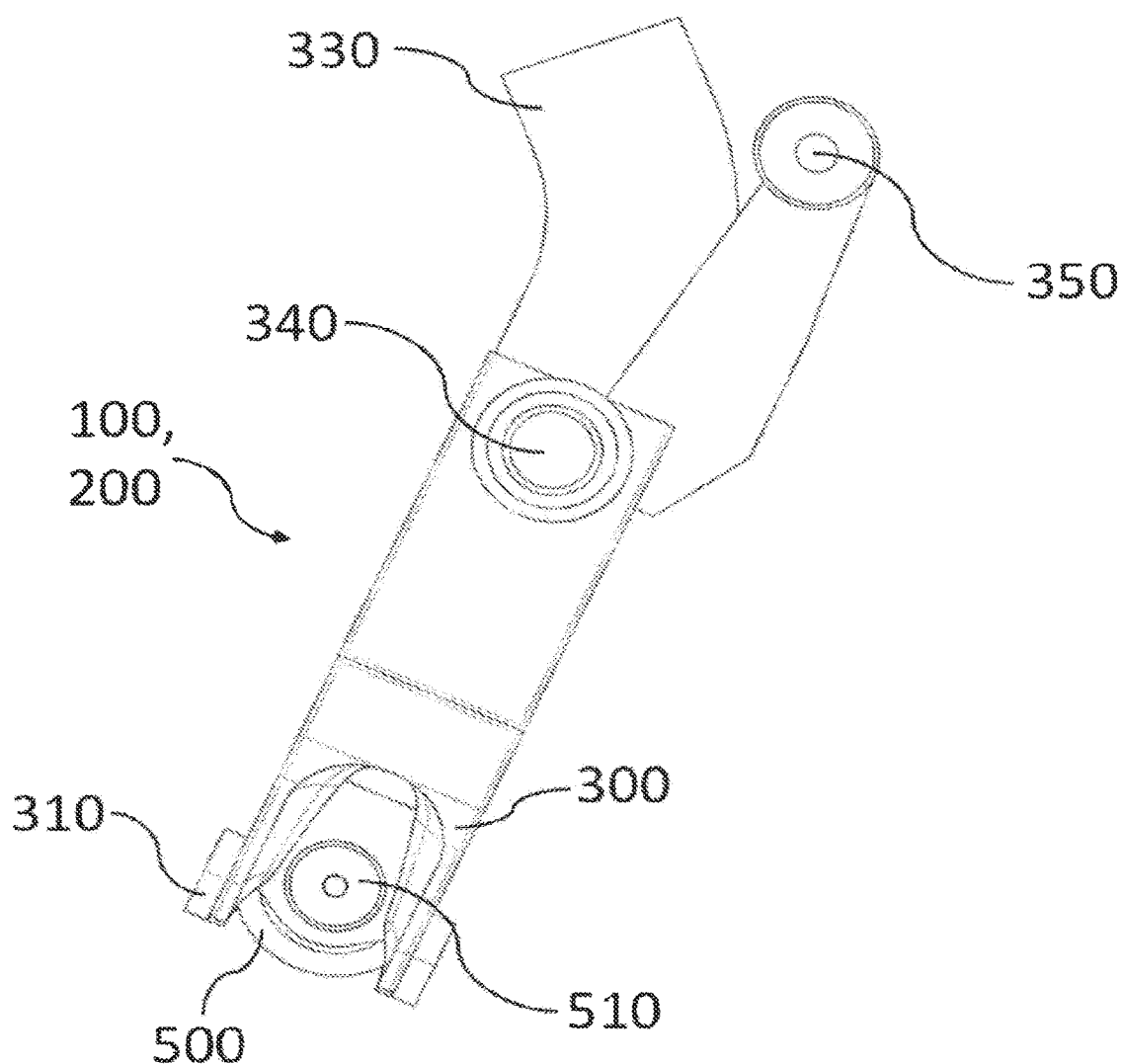
FIG. 8 is a side view of a suction device with a blade.

FIG. 8 is a side view of a first or second suction device 100, 200 with a vacuum nozzle 300 at one end with a lip 310, suitable for scooping blood, blood vessels etc. from the abdominal cavity of a fish (not shown) without damaging the fish meat. Further, the vacuum nozzle 300 has a blade 500 rotatably mounted inside the vacuum nozzle 300, the blade 500 arranged with a motor 510 to enable the blade 500 to rotate. At the opposite end of the vacuum nozzle 300, the suction device 100, 200 has a duct 330 attached to a vacuum mechanism (not shown) providing suction to the vacuum nozzle 300. The suction device is able to pivot through the rotation bracket 340 and move through actuation from the actuator mechanism (not shown) which is attached to the suction device 100, 200 through the actuator bracket 350.

Figure 9:
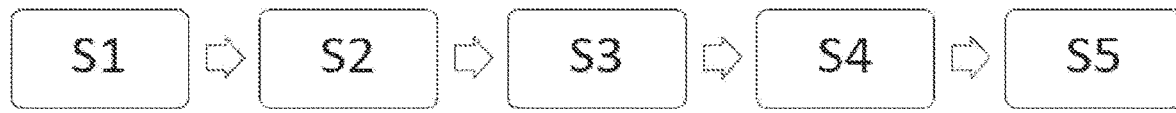
FIG. 9 is a flow-chart of a method according to the invention.

FIG. 9 illustrates steps of a method embodiment of a fish processing device with a transport mechanism and at least a first suction device for removing blood and blood vessels along a spine of a fish, the method comprising:
S1—transporting the fish along a transport direction,
S2—spraying pressurized liquid at least from a first jet nozzle into the abdominal cavity of the fish, so as to loosen blood and blood vessels along the spine of the fish,
S3—causing a first vacuum nozzle to enter the abdominal cavity of the fish in a first angle relative to a longitudinal axis of said fish, and moving the first vacuum nozzle in a first direction relative to the transport direction, until the first vacuum nozzle reaches the an end of the abdominal cavity of said fish while sucking blood and blood vessels from the abdominal cavity along the spine of said fish,
S4—causing the first vacuum nozzle to be oriented towards the abdominal cavity of the fish at a second angle relative to the longitudinal axis of said fish, and moving the first vacuum nozzle in a second direction being opposite the first direction while sucking blood and blood vessels from the abdominal cavity along the spine of said fish, and
S5—causing the first vacuum nozzle to exit the abdominal cavity of said fish, when the first vacuum nozzle reaches an opposite end of the abdominal cavity of said fish.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A fish processing device arranged to receive a fish, said fish processing device comprising:
a transport mechanism with a surface arranged to transport the fish along a transport direction, said fish being oriented with a head end towards or opposite the transport direction and the abdominal cavity of the fish oriented opposite to the surface of the transport mechanism,
a first suction device comprising:
a first vacuum nozzle arranged to suck at least liquid and blood vessels from the fish,
a first actuator mechanism for moving the first vacuum nozzle,
at least a first jet nozzle arranged to spray a pressurized liquid into the abdominal cavity of the fish, so as to loosen blood and blood vessels along the spine of said fish,
a controller arranged to control the first actuator mechanism and the at least first jet nozzle, so as:
to cause the first jet nozzle to spray pressurized liquid along the spine of said fish,
to cause the first vacuum nozzle to enter the abdominal cavity of the fish in a first angle relative to a longitudinal axis of said fish, to move the first vacuum nozzle in a first direction relative to the transport direction, until the first vacuum nozzle reaches an end of the abdominal cavity of said fish while sucking blood and blood vessels from the abdominal cavity along the spine of said fish, and
to cause the first vacuum nozzle to be oriented towards the abdominal cavity of the fish at a second angle relative to the longitudinal axis of said fish, and to move the first vacuum nozzle in a second direction being opposite the first direction while sucking blood and blood vessels from the abdominal cavity along the spine of said fish, until reaching an opposite end of the abdominal cavity of said fish, where the first vacuum nozzle is moved to exit the abdominal cavity of said fish.

2. A fish processing device according to claim 1, wherein the transport mechanism is arranged to continuously move the fish in the transport direction while the first vacuum nozzle is inside the abdominal cavity of the fish.

3. A fish processing device according to claim 1, wherein the first direction is the transport direction.

4. A fish processing device according to claim 1, wherein the first vacuum nozzle is arranged to pivot around an axis so as to change between the first and second angle of orientation relative to the longitudinal axis of the fish.

5. A fish processing device according to claim 1, wherein the first jet nozzle is mounted fixed to the first vacuum nozzle, so as to enter the abdominal cavity of the fish together with the first vacuum nozzle.

6. A fish processing device according to claim 1, wherein the first vacuum nozzle is controlled to enter the abdominal cavity of the fish substantially in the middle, relative to a longitudinal length of the fish.

7. A fish processing device according to claim 1, further comprising a second suction device located after the first suction device, relative to the transport direction of the transport mechanism, the second suction device comprising a second vacuum nozzle, a second actuator mechanism controlled to cause the vacuum nozzle to enter and exit the abdominal cavity of the fish, so as to suck remaining blood and blood vessels along the spine of the fish.

8. A fish processing device according to claim 7, further comprising a second jet nozzle arranged to spray pressurized liquid into the abdominal cavity of the fish, at least partly, along the spine of said fish at least partly while the second vacuum nozzle sucks remaining blood and blood vessels from the abdominal cavity of said fish.

9. A fish processing device according to claim 7, wherein the second vacuum nozzle enters the abdominal cavity of the fish less than 1 second after the first vacuum nozzle exits the abdominal cavity of said fish.

10. A fish processing device according to claim 1, wherein the pressurized liquid is sprayed from the first jet nozzle with a pressure between 1 and 50 bar.

11. A fish processing device according to claim 1, wherein the first vacuum nozzle is arranged to suck with a pressure being between −0.1 and −0.8 bar.

12. A fish processing device according to claim 1, wherein the first vacuum nozzle enters the abdominal cavity of the fish at the first angle being between 1 and 89 degrees.

13. A fish processing device according to claim 1, wherein the controller is arranged to cause the first vacuum nozzle to be oriented at the second angle being between 179 and 91 degrees.

14. A fish processing device according to claim 1, wherein the first vacuum nozzle is shaped like a half moon shape having a radius and wherein the radius of said half moon shape is between 2 and 8 cm.

15. A method for removing blood and blood vessels along a spine of a fish, comprising:
- transporting the fish along a transport direction,
- spraying pressurized liquid at least from a first jet nozzle into the abdominal cavity of the fish, so as to loosen blood and blood vessels along the spine of the fish,
- causing a first vacuum nozzle to enter the abdominal cavity of the fish in a first angle relative to a longitudinal axis of said fish, and moving the first vacuum nozzle in a first direction relative to the transport direction, until the first vacuum nozzle reaches an end of the abdominal cavity of said fish while sucking blood and blood vessels from the abdominal cavity along the spine of said fish,
- causing the first vacuum nozzle to be oriented towards the abdominal cavity of the fish at a second angle relative to the longitudinal axis of said fish, and moving the first vacuum nozzle in a second direction being opposite the first direction while sucking blood and blood vessels from the abdominal cavity along the spine of said fish, and
- causing the first vacuum nozzle to exit the abdominal cavity of said fish, when the first vacuum nozzle reaches an opposite end of the abdominal cavity of said fish.

\* \* \* \* \*